US007780519B2

(12) United States Patent
Gomez et al.

(10) Patent No.: US 7,780,519 B2
(45) Date of Patent: Aug. 24, 2010

(54) GAMING MACHINE WITH SYMBOL UPGRADE FEATURE

(75) Inventors: Benjamin T. Gomez, Chicago, IL (US); Alfred Thomas, Las Vegas, NV (US)

(73) Assignee: WMS Gaming, Waukegan, IL (US)

( * ) Notice: Subject to any disclaimer, the term of this patent is extended or adjusted under 35 U.S.C. 154(b) by 871 days.

(21) Appl. No.: 11/237,089

(22) Filed: Sep. 28, 2005

(65) Prior Publication Data

US 2006/0068892 A1 Mar. 30, 2006

Related U.S. Application Data

(60) Provisional application No. 60/614,913, filed on Sep. 30, 2004.

(51) Int. Cl.
*G06F 17/00* (2006.01)
*G06F 19/00* (2006.01)

(52) U.S. Cl. ............................ 463/25; 463/13; 463/16; 463/20; 463/29

(58) Field of Classification Search ................... 463/13, 463/16, 20, 25, 29; 273/138.1
See application file for complete search history.

(56) References Cited

U.S. PATENT DOCUMENTS

| | | | | | |
|---|---|---|---|---|---|
| 4,198,052 | A | | 4/1980 | Gauselmann | 273/143 |
| 5,152,529 | A | | 10/1992 | Okada | 273/143 R |
| 5,205,555 | A | | 4/1993 | Hamano | 273/143 R |
| 5,580,055 | A | | 12/1996 | Hagiwara | 273/143 |
| 5,704,835 | A | | 1/1998 | Dietz, II | 463/20 |
| 5,722,891 | A | | 3/1998 | Inoue | 463/20 |
| 5,788,573 | A | | 8/1998 | Baerlocher et al. | 463/16 |
| 5,823,874 | A | | 10/1998 | Adams | 463/17 |
| 5,848,932 | A | | 12/1998 | Adams | 273/143 |
| 5,882,261 | A | * | 3/1999 | Adams | 463/20 |
| 5,931,467 | A | | 8/1999 | Kamille | 273/139 |
| 5,980,384 | A | | 11/1999 | Barrie | 463/16 |
| 5,984,782 | A | | 11/1999 | Inoue | 463/20 |
| 6,004,207 | A | * | 12/1999 | Wilson et al. | 463/20 |
| 6,012,982 | A | | 1/2000 | Piechowiak et al. | 463/16 |

(Continued)

FOREIGN PATENT DOCUMENTS

GB 2 097 160 A 10/1982

(Continued)

OTHER PUBLICATIONS

WMS Gaming Inc., "Big Bang Piggy Bankin"™, *Product Sheet*, (undated), 1 page, Chicago, IL.

(Continued)

*Primary Examiner*—Peter D. Vo
*Assistant Examiner*—Milap Shah
(74) *Attorney, Agent, or Firm*—Nixon Peabody LLP

(57) ABSTRACT

A method of conducting a wagering game on a gaming machine. The method includes receiving a wager from a player and displaying a first winning combination of symbols in an array. The first winning combination is associated with a first award. In response to a predetermined event, the first winning combination is upgraded to a second winning combination of symbols, and the second winning combination is associated with a second award that is higher than the first award. The second winning combination of symbols is displayed and the player is provided with the second award.

17 Claims, 8 Drawing Sheets

U.S. PATENT DOCUMENTS

| | | | | |
|---|---|---|---|---|
| 6,047,963 | A | 4/2000 | Pierce et al. | 273/121 |
| 6,056,642 | A | 5/2000 | Bennett | 463/20 |
| 6,068,552 | A | 5/2000 | Walker et al. | 463/21 |
| 6,089,976 | A | 7/2000 | Schneider et al. | 463/16 |
| 6,089,977 | A | 7/2000 | Bennett | 463/20 |
| 6,089,978 | A | 7/2000 | Adams | 463/20 |
| 6,110,041 | A | 8/2000 | Walker et al. | 463/20 |
| 6,120,378 | A | 9/2000 | Moody et al. | 463/20 |
| 6,155,925 | A | 12/2000 | Giobbi et al. | 463/20 |
| 6,186,894 | B1 | 2/2001 | Mayeroff | 463/20 |
| 6,190,255 | B1 | 2/2001 | Thomas et al. | 463/20 |
| 6,203,429 | B1 | 3/2001 | Demar et al. | 463/20 |
| 6,227,971 | B1 | 5/2001 | Weiss | 463/20 |
| 6,251,013 | B1 * | 6/2001 | Bennett | 463/13 |
| 6,254,481 | B1 | 7/2001 | Jaffe | 463/20 |
| 6,261,178 | B1 | 7/2001 | Bennett | 463/20 |
| 6,270,411 | B1 | 8/2001 | Gura et al. | 463/20 |
| 6,350,199 | B1 | 2/2002 | Williams et al. | 463/16 |
| 6,394,902 | B1 | 5/2002 | Glavich et al. | 463/20 |
| 6,413,162 | B1 * | 7/2002 | Baerlocher et al. | 463/20 |
| 6,419,579 | B1 | 7/2002 | Bennett | 463/20 |
| 6,471,208 | B2 * | 10/2002 | Yoseloff et al. | 273/143 R |
| 6,517,432 | B1 | 2/2003 | Jaffe et al. | 463/16 |
| 6,544,120 | B2 | 4/2003 | Ainsworth | 463/20 |
| 6,565,433 | B1 | 5/2003 | Baerlocher et al. | 463/20 |
| 6,582,306 | B1 | 6/2003 | Kaminkow | 463/20 |
| 6,589,114 | B2 * | 7/2003 | Rose | 463/20 |
| 6,605,000 | B2 | 8/2003 | Adams | 463/20 |
| 6,612,574 | B1 * | 9/2003 | Cole et al. | 273/138.1 |
| 6,634,945 | B2 | 10/2003 | Glavich et al. | 463/25 |
| 6,641,477 | B1 | 11/2003 | Dietz, II | 463/20 |
| 6,749,504 | B2 | 6/2004 | Hughs-Baird | 463/20 |
| 2002/0010017 | A1 | 1/2002 | Bennett | 463/20 |
| 2002/0068623 | A1 | 6/2002 | Gauselmann | 463/20 |
| 2002/0142825 | A1 | 10/2002 | Lark et al. | 463/16 |
| 2002/0142846 | A1 | 10/2002 | Paulsen | 463/43 |
| 2003/0022713 | A1 | 1/2003 | Jasper et al. | 463/20 |
| 2003/0027623 | A1 * | 2/2003 | Rose | 463/20 |
| 2003/0032470 | A1 * | 2/2003 | Weiss et al. | 463/16 |
| 2003/0054872 | A1 | 3/2003 | Locke et al. | 463/20 |
| 2003/0064779 | A1 | 4/2003 | Suda | 463/20 |
| 2003/0064796 | A1 | 4/2003 | Glavich et al. | 463/25 |
| 2003/0064800 | A1 | 4/2003 | Jackson et al. | 463/30 |
| 2003/0069062 | A1 | 4/2003 | Shimizu | 463/20 |
| 2003/0083121 | A1 * | 5/2003 | Cole et al. | 463/16 |
| 2003/0092480 | A1 * | 5/2003 | White et al. | 463/20 |
| 2003/0216165 | A1 | 11/2003 | Singer et al. | 463/20 |
| 2004/0051239 | A1 * | 3/2004 | Seelig et al. | 273/138.1 |
| 2005/0026673 | A1 | 2/2005 | Paulsen et al. | 463/16 |
| 2005/0096113 | A1 * | 5/2005 | Gabuchian | 463/16 |
| 2005/0159208 | A1 * | 7/2005 | Pacey | 463/20 |
| 2005/0197182 | A1 * | 9/2005 | Duhamel | 463/22 |

FOREIGN PATENT DOCUMENTS

| | | | |
|---|---|---|---|
| GB | 2 117 155 | A | 10/1983 |
| GB | 2 117 952 | A | 10/1983 |
| GB | 2130413 | A | 5/1984 |
| WO | WO 97/19736 | | 6/1997 |
| WO | WO 97/57569 | | 7/1997 |
| WO | WO 01/33478 | A1 | 5/2001 |
| WO | WO 02/054331 | A2 | 7/2002 |
| WO | WO 03/089084 | A1 | 10/2003 |

OTHER PUBLICATIONS

WMS Gaming Inc., "Stroke of Luck"™, *Product Sheet*, (undated), 1 page, Chicago, IL.

WMS Gaming Inc., "Top Cat"™, *Product Sheet*, (undated), 1 page, Chicago, IL.

WMS Gaming Inc., "Winning Streak"™, *Product Sheet*, (undated), 1 page, Chicago, IL.

"Arrow Line" by Bally, 1971 (appearing in Bally Slot Machines, Revised 3rd Edition, Liberty Belle Books, by Marshall Fey, p. 17).

"Double or Nothing" by Bally Distributing Company, approx. 1975 (appearing in Lemons, Cherries, and Bell-Fruit-Gum, by Richard M. Bueschel, 1995, p. 267).

"Extra Line" by Bally, 1971 (appearing in Bally Slot Machines, Revised 3rd Edition, Liberty Belle Books, by Marshall Fey, p. 23).

"Fistful of Fives" by Jubilee, pre-1994—In the "Fistful of Fives" machine by Jubilee, a player is able to insert up to five coins to play up to five win lines on the three main reels. These three reels pay the amounts shown on the front of the machine for certain combinations. For instance, three 7's pays five coins. Spaced-apart from the three main reels are two bonus reels; one displays odds such as even, ten-to-one, six-to-one, five-to-one, etc., while the second bonus reel identifies a win-line of the main reels. When a player wins on the main reels, the winning amount is multiplied by the odds shown on the first bonus reel for the win line shown on the second bonus reel. Thus, for example, "7-7-7" on the main reels, and ten-to-one on the first bonus reel pays 50 coins, if the win lines having the 7-7-7 is show on the second bonus reel. Every spin of the main reels causes a simultaneous spin of the bonus reels. No additional coins are required to participate in the increased odds associated with the bonus reels.).

"Lucky Twins Continental" by Bally, 1972 (appearing in Bally Slot Machines, Revised 3rd Edition, Liberty Belle Books, by Marshall Fey, p. 26).

"Twin Lightning" by Bally, 1972 (appearing in Bally Slot Machines, Revised 3rd Edition, Liberty Belle Books, by Marshall Fey, p. 28).

* cited by examiner

GAMING MACHINE WITH SYMBOL UPGRADE FEATURE

CROSS-REFERENCE TO RELATED APPLICATIONS

This application claims the benefit of priority of U.S. Provisional Patent Application No. 60/614,913, filed Sep. 30, 2004, which is hereby incorporated by reference in its entirety.

FIELD OF THE INVENTION

The present invention relates generally to gaming machines for playing a wagering game and, more particularly, to a gaming machine with a symbol upgrade feature.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept which has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Generally, bonus games provide a greater expectation of winning than the basic game and may also be accompanied with more attractive or unusual video displays and/or audio. Because the bonus game concept offers tremendous advantages in player appeal and excitement relative to other known games, and because such games are attractive to both players and operators, there is a continuing need to develop gaming machines with new types of bonus games to satisfy the demands of players and operators.

Various entertainment and attraction features have been added to gaming machines with varied success. Traditional enhanced features award bonus credits, free spins, or other prizes for certain winning combinations of symbols on gaming machines. However, these traditional features offer limited entertainment, excitement and anticipation to a player in that the bonus awarded is not often accompanied with satisfactory suspense or additional game play. Therefore, a need exists for a gaming machine that awards suspenseful and exciting bonus award opportunities to a player to increase the enjoyment of game play and offer additional game play while awarding such bonus. The present invention is directed at solving these and other problems.

SUMMARY OF THE INVENTION

In accordance with the foregoing, a gaming machine for conducting a wagering game includes a primary display for displaying the wagering game. The gaming machine is controlled by a processor. The primary display displays the play of at least the basic game of the gaming machine. The gaming machine further includes a symbol upgrade feature triggered by at least one upgrade symbol in the game. According to one aspect of the invention, the basic game is a slot game including a plurality of reels and at least one pay table. The slot game includes certain winning combinations. At least one of the reels is a bonus reel, while the remainder of the reels are standard slot reels having a variety of symbols. The bonus reel includes at least one upgrade symbol. A winning combination of symbols on the payline on the standard reels is upgraded to a higher payout level on the pay table when the upgrade symbol on the bonus reel lands on the payline. In one embodiment, the upgrade is to the next highest level on the pay table.

According to another aspect of the invention, the upgrade symbol upgrades a subsequent winning combination on the gaming machine to a higher level on the pay table. In one embodiment, the upgrade is to the next highest level on the pay table.

According to yet another aspect of the invention, the gaming machine is a traditional slot game comprising a plurality of reels bearing a plurality of symbols, and at least one payline. At least one of the symbols on the reels is an upgrade symbol. Winning combinations of symbols on the payline result in payouts to the player in accordance with a pay table of the gaming machine. Upgrade symbols on the reels landing on the payline are accumulated in a bank by the player, and applied to future plays of the gaming machine. The upgrade symbols may be applied automatically by the machine to the next or other subsequent plays of the gaming machine. Alternatively, the player may select when to apply the upgrade symbols to future plays of the gaming machine. In either case, the application of the upgrade symbol to a winning combination of the gaming machine upgrades that winning combination to a higher level payout in accordance with the pay table. The upgrade symbols may be either applied one at a time or in groups as they are accumulated by the player.

According to another embodiment of the present invention, a method of conducting a wagering game is provided. The method includes receiving a wager from a player and displaying a plurality of symbols on a first set of reels. The plurality of symbols indicates a first randomly selected outcome, such that the first randomly selected outcome is selected from a plurality of outcomes. The plurality of outcomes includes a plurality of winning outcomes. In response to the first randomly selected outcome including a bonus-triggering event, a second set of reels is triggered and displays a bonus symbol. In response to the bonus symbol being an upgrade symbol, the player is provided with an upgrade award, which is larger than a first award associated with the first randomly selected outcome.

According to yet another embodiment of the present invention, a gaming machine is provided. The gaming machine includes an input device for receiving inputs from a player during the wagering game. The inputs include a wager amount. The gaming machine also includes a display for displaying a plurality of symbols that indicate a randomly selected outcome of the wagering game. The randomly selected outcome is selected from a plurality of outcomes, which include an upgrade-triggering outcome and a plurality of winning outcomes. Each of the plurality of winning outcomes has an associated initial game payout. In response to the randomly selected outcome being the upgrade-triggering outcome, an award amount awarded to a player is upgraded.

Additional aspects of the invention will be apparent to those of ordinary skill in the art in view of the detailed description of various embodiments, which is made with reference to the drawings, a brief description of which is provided below.

DESCRIPTION OF ILLUSTRATIVE EMBODIMENTS

Figure 1:
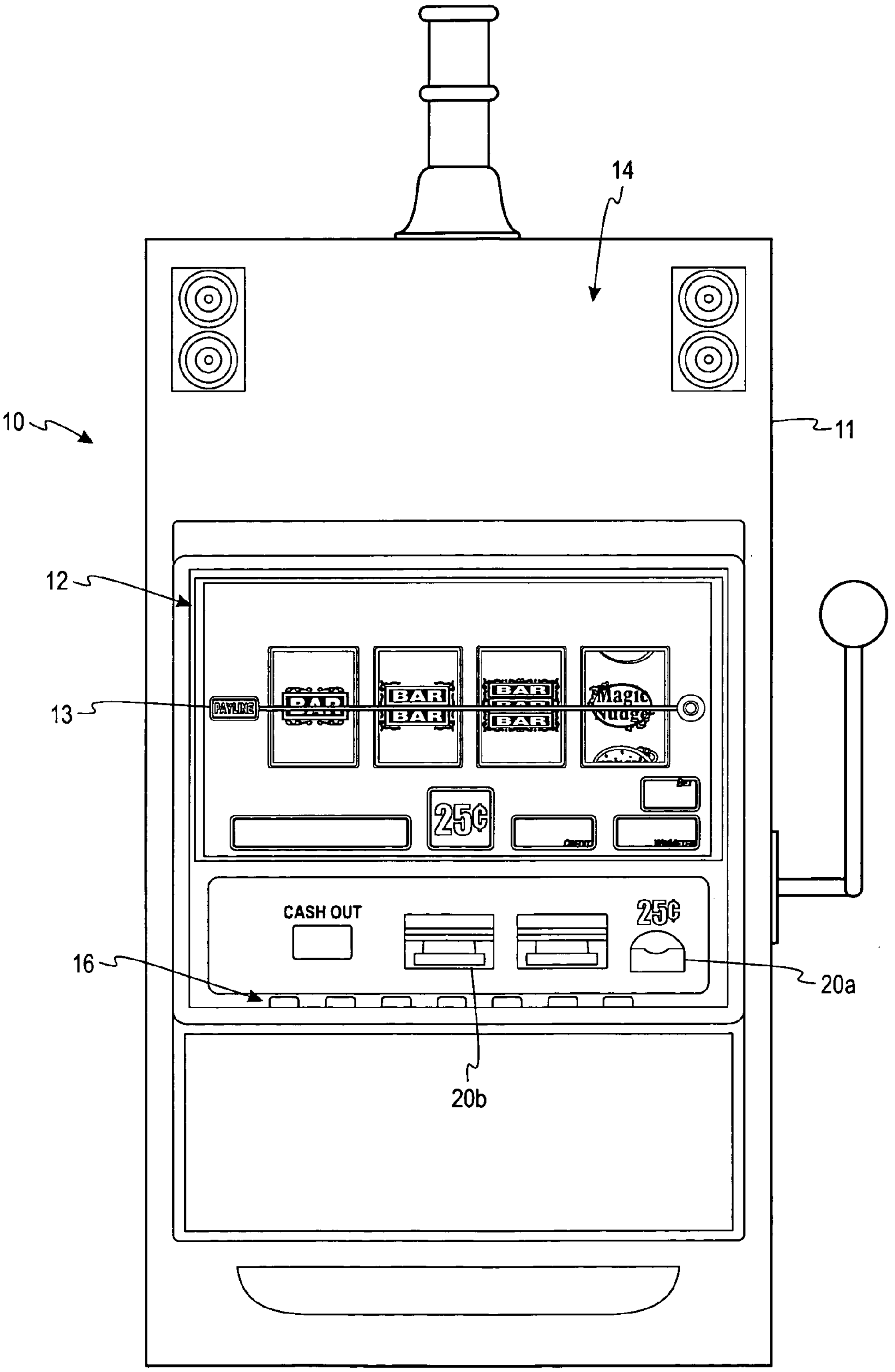
FIG. 1 is a perspective view of a gaming machine according to one embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 having a symbol upgrade feature is used in gaming establishments such as casinos. With regard to the present invention, the gaming machine 10 may be any type of gaming machine and may have varying structures and methods of operation. For example, the gaming machine 10 may be a mechanical gaming machine configured to play mechanical slots, or it may be an electromechanical or electrical gaming machine configured to play a video casino game, such as blackjack, slots, keno, poker, etc.

The gaming machine 10 comprises a housing 11 and includes input devices, including a value input device 20 and a player input device 16. The player input device 16 may, for example, comprise a plurality of push buttons on a button panel for operating the gaming machine 10. For output, the gaming machine 10 includes a primary display 12 for displaying information about the basic wagering game. The primary display 12 can also display information about a bonus wagering game and a progressive wagering game. The gaming machine 10 also includes a secondary display 14 for displaying a pay table, game events, and/or signage information. While these typical components found in the gaming machine 10 are described below, it should be understood that numerous other elements may exist and may be used in any number of combinations to create various forms of a gaming machine 10.

The value input device 20 may be provided in many forms, individually or in combination, and is preferably located on the front of the housing 11. The value input device 20 receives currency and/or credits that are inserted by a player. The value input device 20 may include a coin acceptor 20*a* for receiving coin currency (see FIG. 1). Alternatively, or in addition, the value input device 20 may include a bill acceptor 20*b* for receiving cash. Furthermore, the value input device 20 may include a ticket reader, or barcode scanner, for reading information stored on a credit ticket, a card, or other tangible portable credit storage device. The credit ticket or card may also authorize access to a central account, which can transfer money to the gaming machine 10.

The various components of the gaming machine 10 may be connected directly to, or contained within, the housing 11, as seen in FIG. 1, or may be located outboard of the housing 11 and connected to the housing 11 via a variety of different connection methods well known in the art, including network connections, wireless connections, or other hardwired or remote connections. Thus, the gaming machine 10 comprises these components whether housed in the housing 11 or outboard of the housing 11 and connected remotely. Preferably, the primary display 12, secondary display 14, value input device 20, and player input device 16 are visible from outside of the housing 11 of the gaming machine 10, as seen in FIG. 1.

The operation of the basic wagering game is displayed to the player on the primary display 12. The primary display 12 may have a number of mechanical reels to display the outcome. Alternatively, the primary display 12 may take the form of a cathode ray tube (CRT), a high resolution LCD, a plasma display, a LED, or any other type of video display suitable for use in the gaming machine 10. In the illustrated embodiment, the gaming machine 10 is an "upright" version in which the primary display 12 is oriented vertically relative to the player. Alternatively, the gaming machine may be a "slant-top" version in which the primary display 12 is slanted at about a thirty-degree angle toward the player of the gaming machine 10.

A player begins play of the basic wagering game by inserting a wager input into the value input device 20 of the gaming machine 10. A player can select play by using the player input device 16. The basic game consists of a plurality of symbols on reels that are displayed along at least one payline 13, yielding a plurality of outcomes of the basic game. Such outcomes are randomly selected in response to the wagering input by the player. One or more of the plurality of randomly-selected outcomes may be a start-bonus outcome, which can include any variations of symbols or symbol combinations triggering a bonus game.

Figure 2:
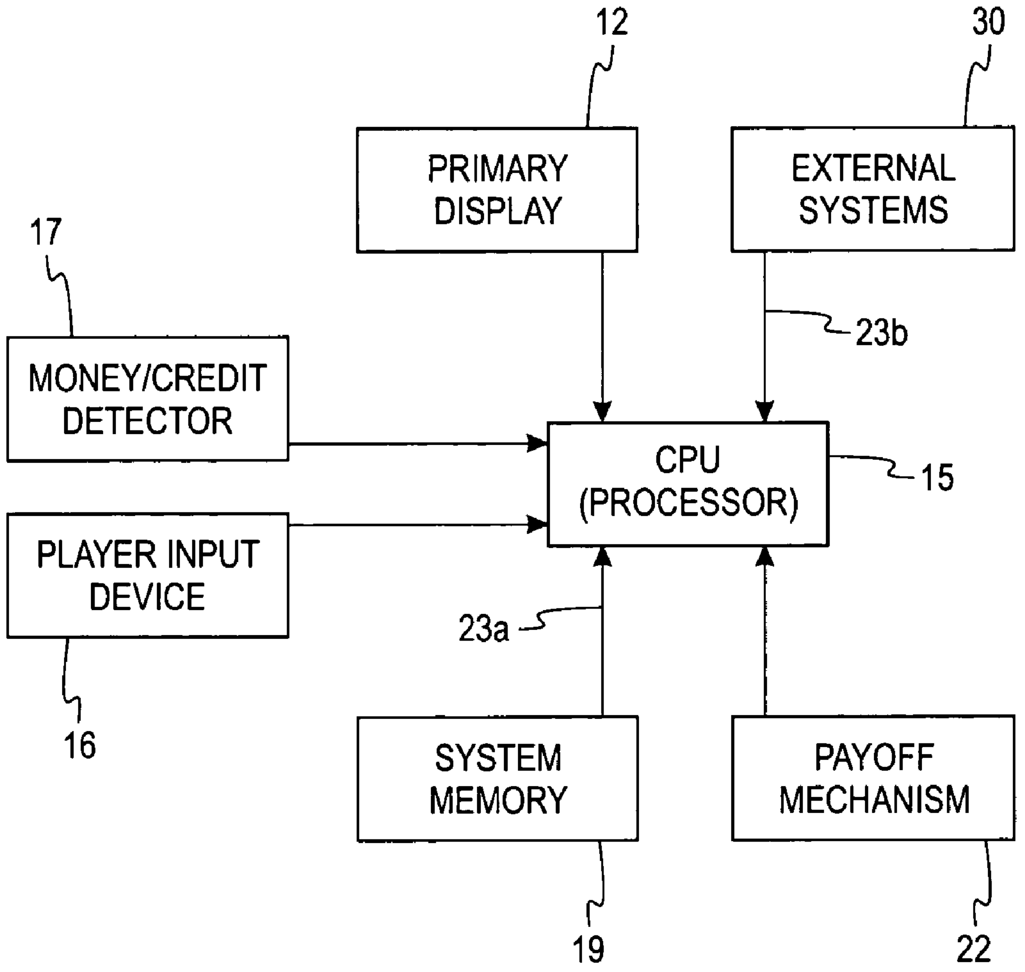
FIG. 2 is a block diagram of a control system suitable for operating the gaming machine.

Turning now to FIG. 2, the various components of the gaming machine 10 are controlled by a central processing unit (CPU) 15, also referred to as a processor (such as a microprocessor or microcontroller). To provide gaming functions, the processor 15 executes one or more game programs. The processor 15 performs the random selection (using a random number generator (RNG)) of an outcome from the plurality of outcomes of the wagering game. Alternatively, the random event may be generated remotely at a remote computer. The remote computer may use either an RNG or pooling schema for its central determination of a game outcome. It should be appreciated that the processor 15 may include one or more microprocessors, including, but not limited to, a master processor, a slave processor, and a secondary or parallel processor.

The processor 15 is also coupled to, or includes, a system memory 19 and a money/credit detector 17. The system memory 19 may comprise a volatile memory (e.g., a random-access memory (RAM)) and a non-volatile memory (e.g., an EEPROM). The money/credit detector 17 signals the processor that money and/or credits have been input via the value input device 20. The system memory 19 may include multiple RAM and multiple program memories. Preferably, these components are located within the housing 11 of the gaming machine 10 and not visible externally. However, as explained above, these components may be located outboard of the housing 11 and connected to the remainder of the components of the gaming machine 10 via a variety of different connection methods well known in the art, including network connections, wireless connections, or other hardwired or remote connections.

As seen in FIG. 2, the processor 15 is also connected to, and controls, the primary display 12, the player input device 16, and a pay off mechanism 22. The pay off mechanism 22 is operable in response to instructions from the processor 15 to award a payoff to the player in response to certain winning outcomes that might occur in the basic or the bonus game. The payoff may be provided in the form of points, bills, tickets, coupons, cards, etc. The pay off amounts distributed by the payoff mechanism 22 are determined by one or more pay tables stored in the system memory 19.

Communications between the peripheral components of the gaming machine 10 and the processor 15 occur through input/output (I/O) circuits 23*a*. As such, the processor 15 also controls and receives inputs from the peripheral components of the gaming machine 10. Further, the processor 15 communicates with external systems 30 via the I/O circuits 23*b*. Although the I/O circuits 23 may be shown as a single block, it should be appreciated that the I/O circuits 23 may include a number of different types of I/O circuits.

Figure 3:
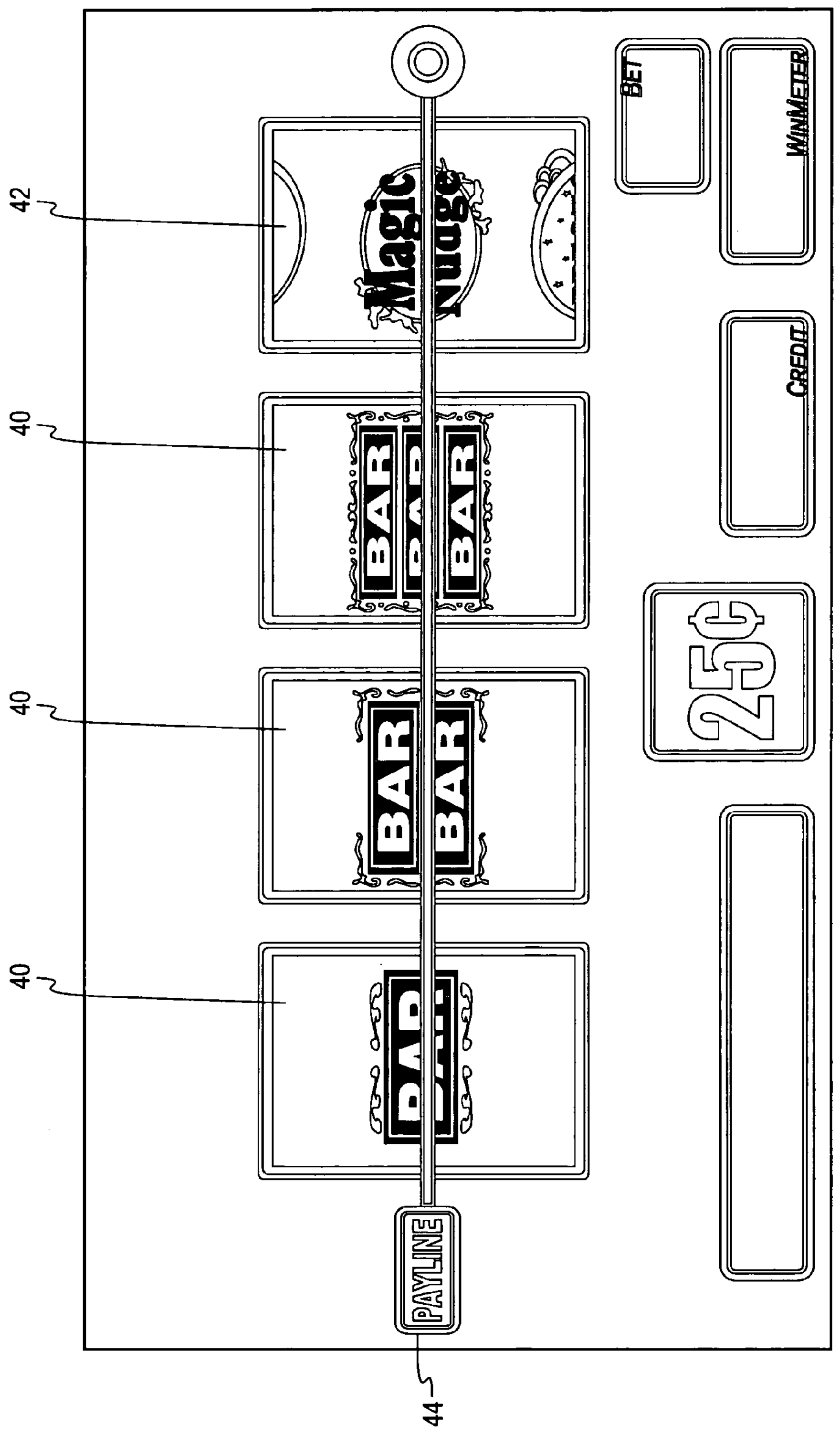
FIGS. 3 through 7 are representations of the display of the gaming machine.

Turning now to FIG. 3, the gaming machine displays a game that includes a plurality of symbols arranged in an array. The game on the gaming machine can be one of any number of games capable of being played on a gaming machine, having a variety of symbols and including a plurality of winning combinations of symbols. Preferably, the game on the gaming machine is a slot game, comprising a plurality of reels 40, 42 and at least one payline 44. In one embodiment, shown in FIG. 3, the gaming machine includes three standard reels 40 and one bonus reel 42. The standard reels 40 include a plurality of standard symbols arranged along the perimeter of the reels. The bonus reel 42 includes a plurality of bonus symbols. The various bonus symbols activate various bonus features of the gaming machine:

- 2×—When a win combination appears on the three standard reels with the "2×" symbol on the bonus reel then the win combination is multiplied by 2.
- 5×—When a win combination appears on the three standard reels with the "5×" symbol on the bonus reel then the win combination is multiplied by 5.
- 10×—When a win combination appears on the three standard reels with the "10×" symbol on the bonus reel then the win combination is multiplied by 10.
- Magic Mayhem—When a win combination appears on the three standard reels with the "Magic Mayhem" symbol on the bonus reel, then the win combination re-spins to the same win and potentially re-spins to the same win up to 7 times, resulting in the player being awarded up to seven times the original payout.
- Magic Nudge—When a losing combination appears on the three standard reels with potential win symbol one position above or below the payline and the "Magic Nudge" symbol on the bonus reel then the potential win symbols on the three standard reels nudge to the payline to create the win.
- Presto—When a win combination appears on the three standard reels with the "Presto" on the bonus reel then the three standard reels re-spin to a symbol combination that pays better than the previous symbol combination. Note: In some embodiments, the player will only be awarded for the better respin outcome and not the previous combination.
- Pay 5—When any win or lose combination appears with the "Pay 5" symbol on the bonus reel, then an additional 5 credits are won.
- Pay 10—When any win or lose combination appears with the "Pay 10" symbol on the bonus reel, then an additional 10 credits are won.
- Pay 20—When any win or lose combination appears with the "Pay 20" symbol on the bonus reel, then an additional 20 credits are won.

As noted above, the "Presto" bonus symbol serves as an upgrade symbol which activates the symbol upgrade feature of the gaming machine, explained in greater detail below.

Figure 4:
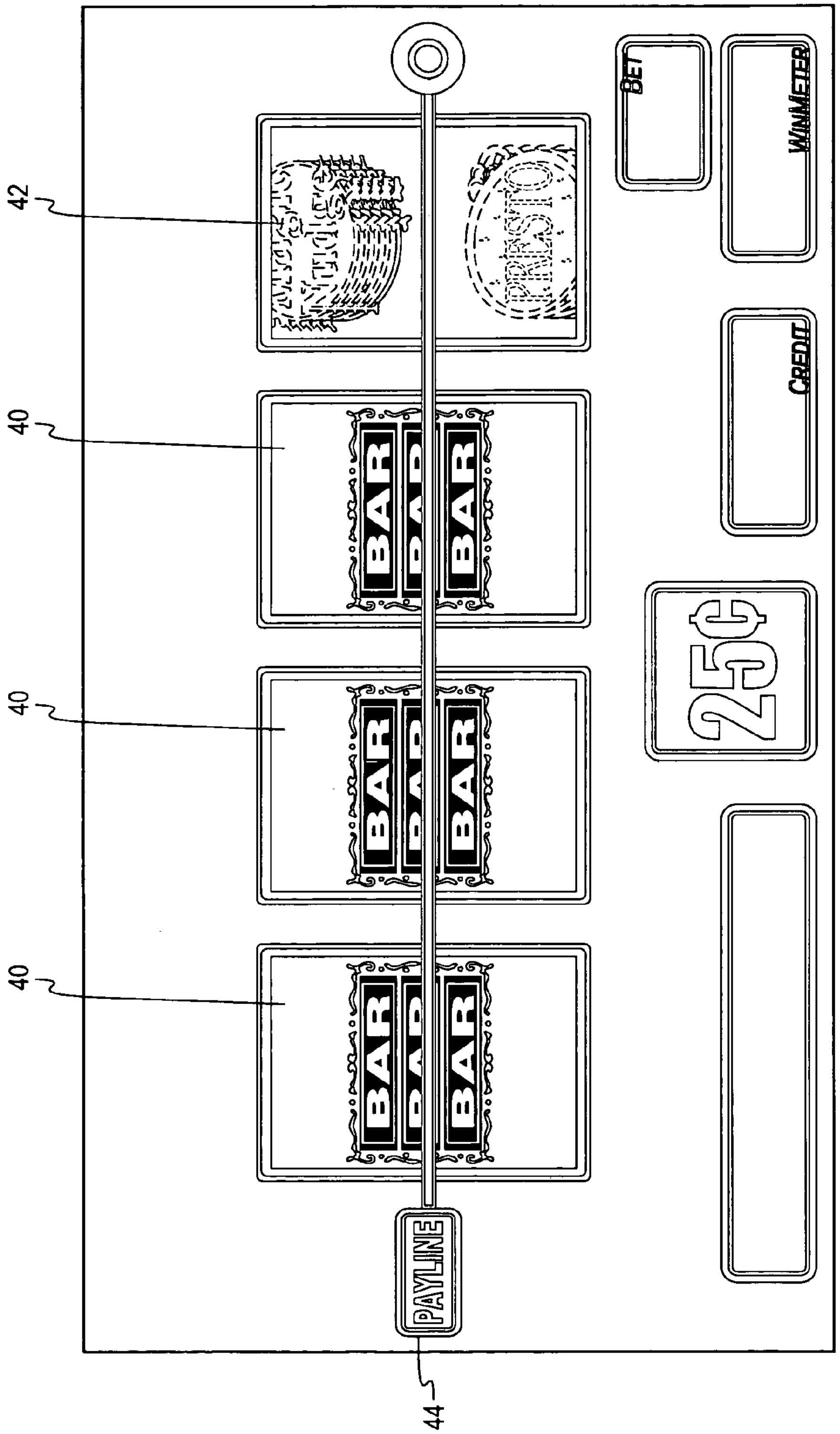

Turning to FIG. 4, the gaming machine is shown after a play of the gaming machine has been executed. The play of the gaming machine culminates when the standard reels 40 stop and display a combination of standard symbols landing on the payline 44 of the gaming machine. Certain combinations of symbols landing on the payline 44 are winning combinations, for which payouts are awarded to the player in accordance with a pay table of the gaming machine (See FIG. 8). In FIG. 4, the winning combination on the standard reels 40 is three "triple-bar" symbols on the payline 44. One or more winning combinations of the gaming machine trigger the play of the bonus reel 42, and hence are referred to as a triggering winning combination.

Figure 5:
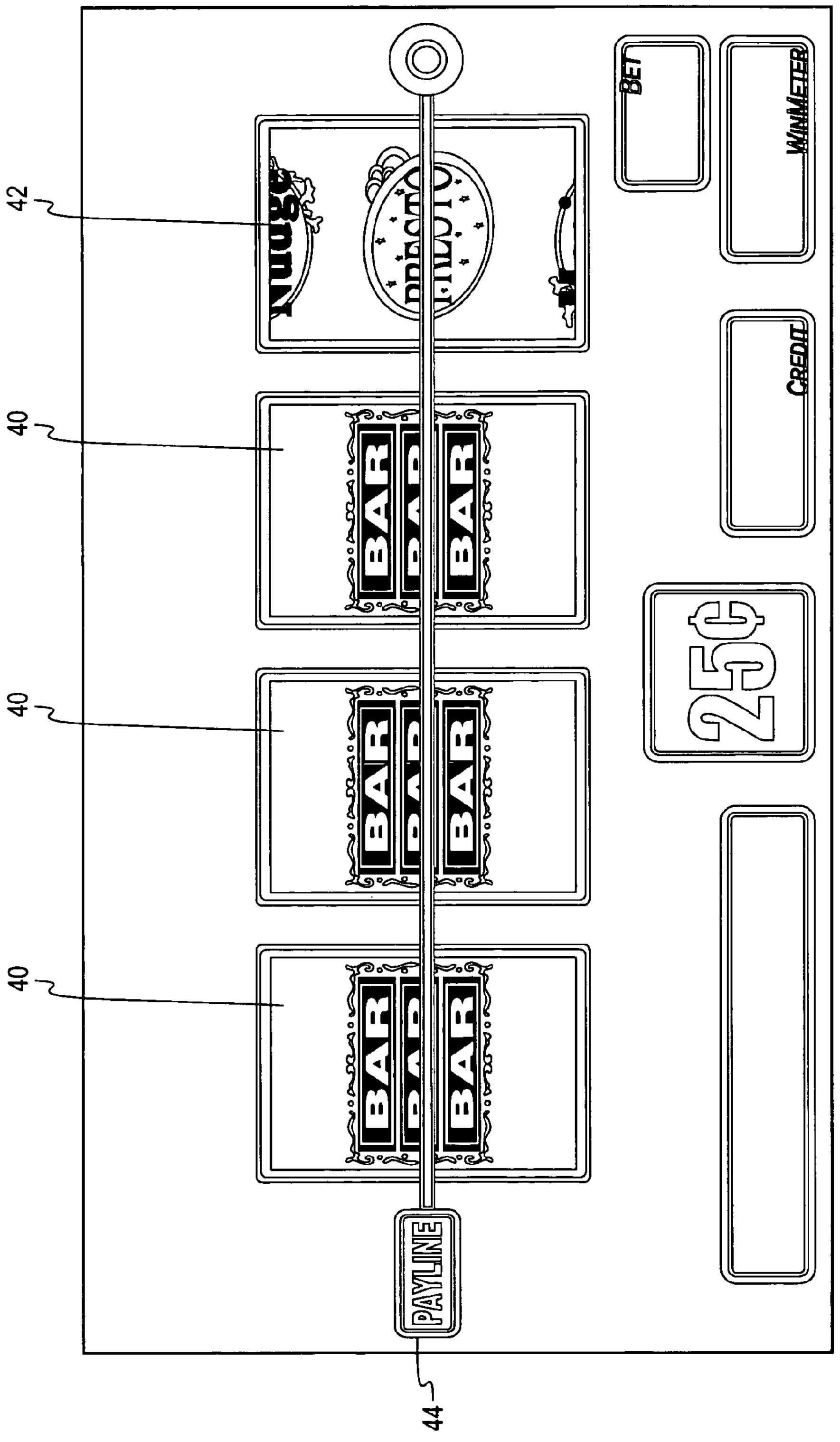

When such a triggering winning combination is achieved, as in FIG. 4, the bonus reel 42 is activated, which spins and stops, as depicted in FIGS. 4 and 5. In FIG. 4, the bonus reel 42 spins to determine which bonus, if any, will be activated in response to the winning combination of the standard reels 40. In FIG. 5, the bonus reel 42 comes to a stop such that the bonus symbol on the payline is the "Presto" symbol, which is an upgrade symbol in this embodiment. This particular bonus symbol, the upgrade symbol, activates the symbol upgrade feature, which is described herein. It should be understood that the standard reels 40 and the bonus reel 42 may spin at the same time during a play of the game, or the bonus reel 42 may be spun either before or after the spinning of the standard reels 40. Furthermore, the bonus reel 42 may spin at the same time as the standard reels 40, but may be permitted to continue to spin after the standard reels 40 are stopped to provide added excitement and anticipation in the play of the gaming machine. If a bonus symbol lands on the payline, the bonus associated with that bonus symbol is activated.

Figure 6:
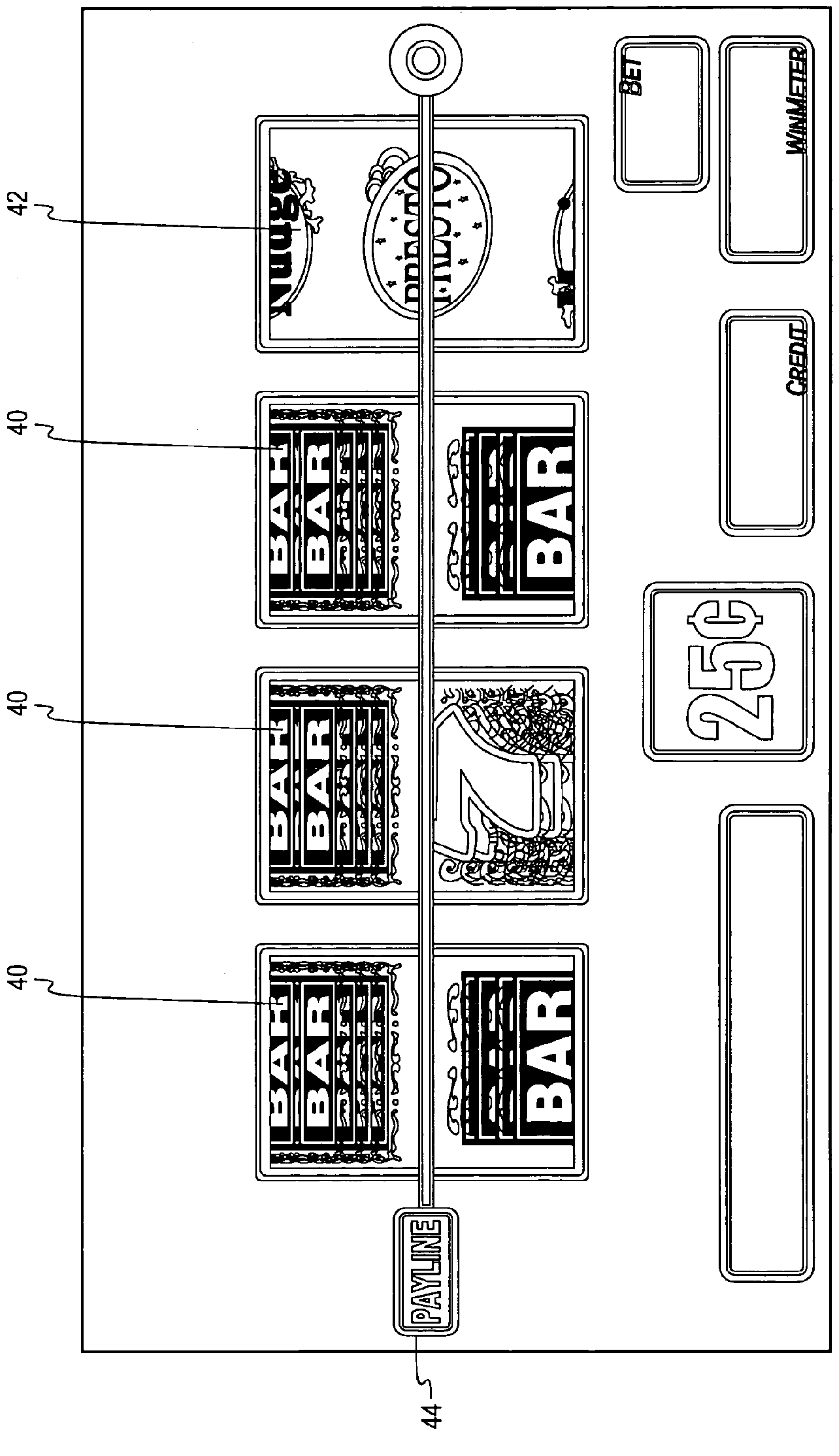

Turning to FIG. 6, the gaming machine is depicted executing the symbol upgrade feature. Because the upgrade symbol ("Presto") has landed on the payline on the bonus reel 42 following a triggering winning combination on the standard reels 40, the symbol upgrade feature is executed. The symbol upgrade feature awards the player a higher payout than the payout associated with the triggering winning combination. The higher payout is associated with a different winning combination as seen in the pay table (see FIG. 8). In the embodiment shown, the symbol upgrade feature awards the player the next highest award above the triggering winning combination in the pay table. However, it should be understood that the upgrade feature may award a symbol upgrade to any winning combination which provides a larger payout than the triggering winning combination.

In executing the symbol upgrade feature, the gaming machine first determines that a triggering winning combination has landed on the payline 44 on the standard reels 40, and that an upgrade symbol has landed on the payline 44 on the bonus reel 42. The gaming machine then determines the payout associated with the triggering winning combination. Using the pay table, the gaming machine next determines the winning combination of symbols which provides a larger payout than the payout associated with the triggering winning combination. As stated, in this embodiment of the invention, the gaming machine selects the winning combination associated with the next highest payout in the pay table. This winning combination is referred to as the upgraded winning combination. Thus, the symbol upgrade feature of the gaming machine acts to upgrade the triggering winning combination to the upgraded winning combination while awarding the player the higher payout associated with the upgraded winning combination.

Figure 7:
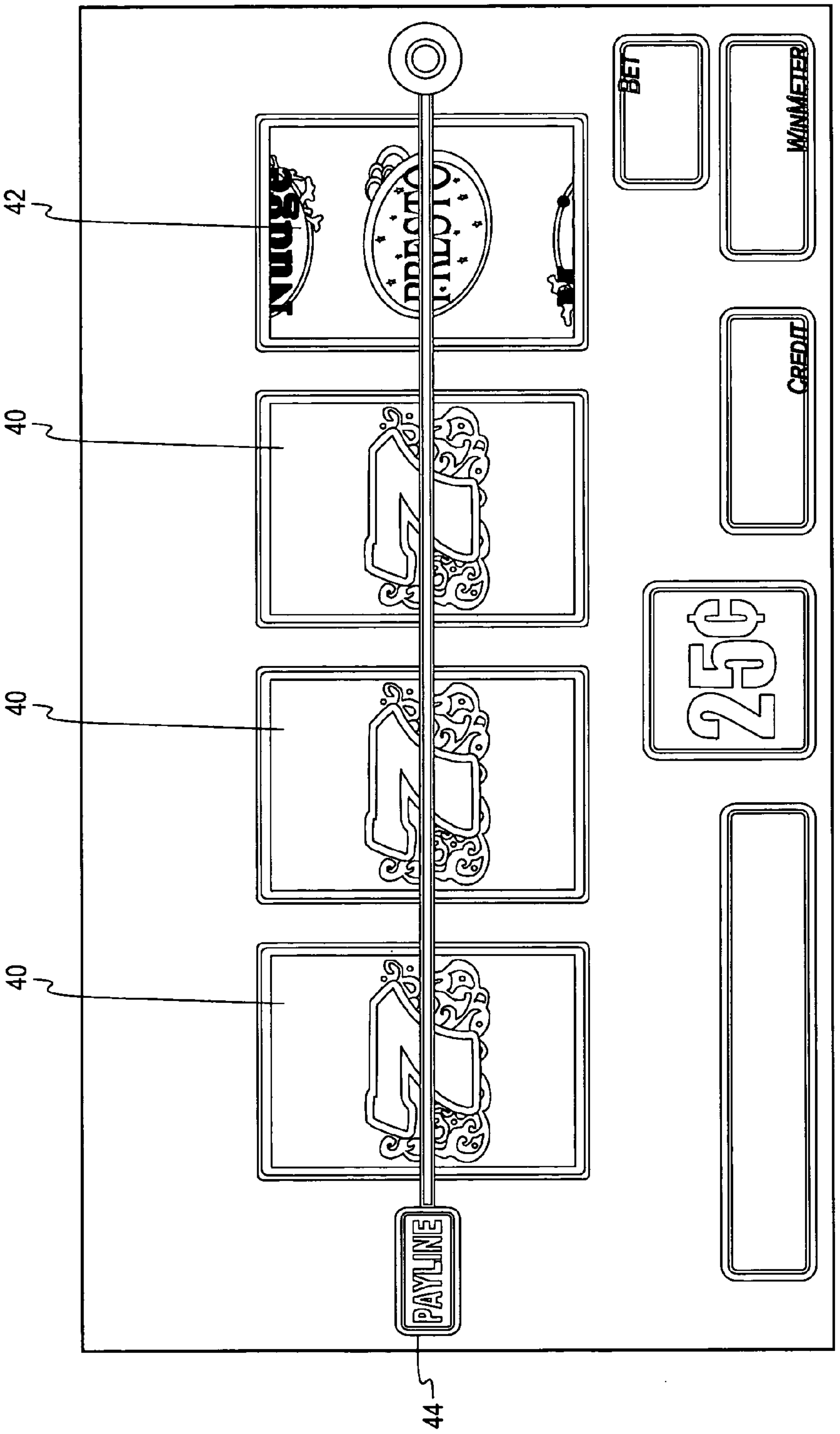

Returning to FIG. 6, the standard reels 40 are shown spinning from the triggering winning combination to the upgraded winning combination. Turning to FIG. 7, the standard reels 40 have stopped spinning to reveal three "7" symbols on the payline 44, which in this embodiment, is the upgraded winning combination. Thus, the symbol upgrade feature culminates by displaying the upgraded winning combination and awarding the upgraded payoff associated with such combination.

Figure 8:
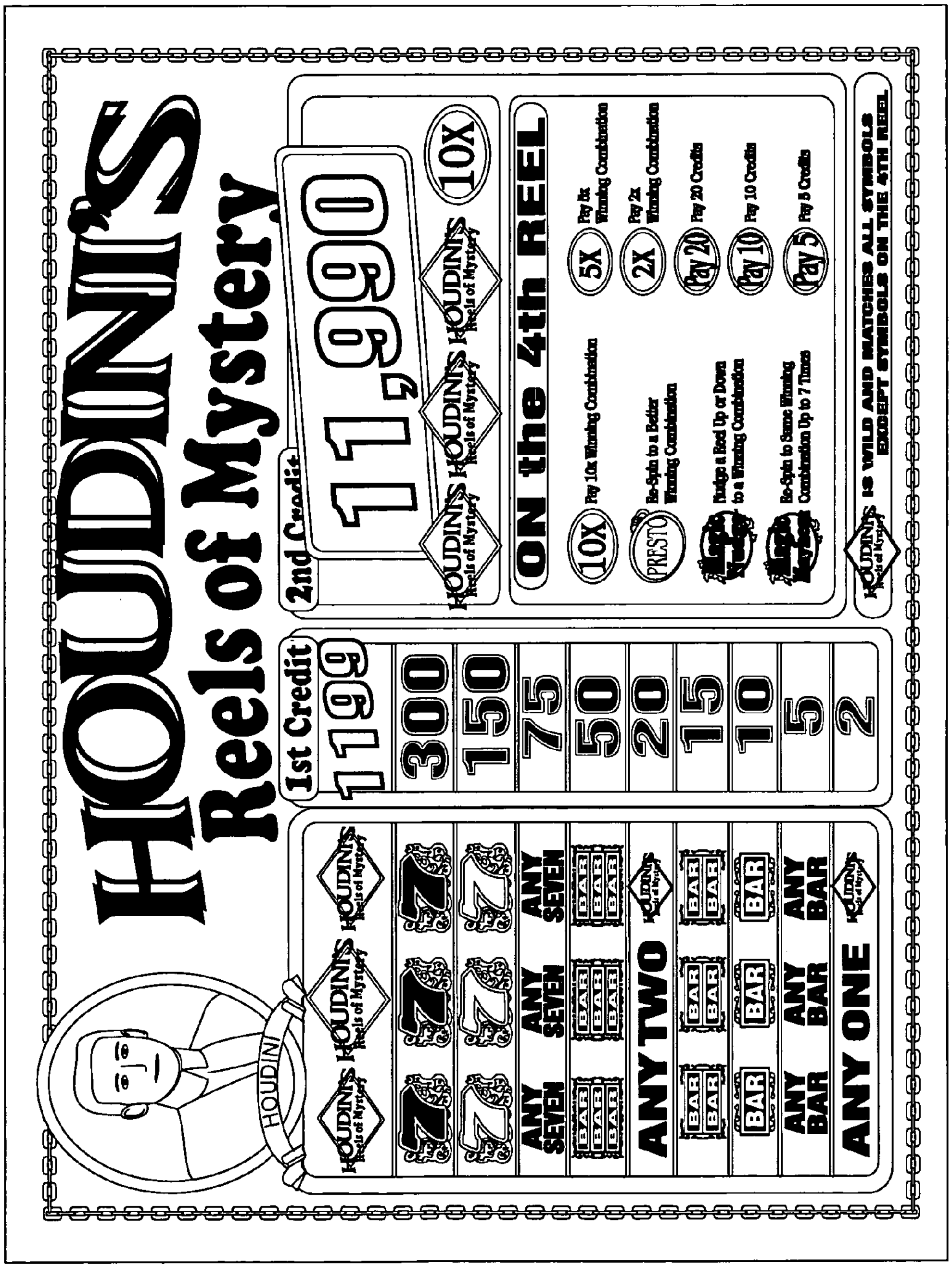
FIG. 8 is a representation of a pay table of the gaming machine.

The pay table of the gaming machine is depicted in FIG. 8. The pay table lists the various payouts associated with the various winning combinations of the gaming machine. As can be seen in FIG. 8, the payout awarded to the player also varies with the amount wagered. In this embodiment, the pay table provides certain payouts for wagers of one credit or two credits. If a player wagers one credit on each play of the game, he or she will receive only the payouts listed in the "$1^{st}$ credit" column of the pay table for each winning combination. Only if a player wagers the maximum of two credits will he or she be eligible for both the payouts associated with the winning combinations as well as any upgraded payout achieved through acquiring the symbol upgrade bonus, as seen in the "$2^{nd}$ credit" section of the pay table. Thus, for example, if a player wagers one credit and achieves the winning combination of three "single-bar" symbols on the payline, he or she would receive a payout of 10 credits. However, if the player wagers two credits and achieves the same winning combination of three "single-bar" symbols on the payline, and in addition activates the symbol upgrade bonus on the bonus reel, then the winning combination would be upgraded to three "double-bar" symbols and the player would receive a payout of 15 credits in accordance with the pay table.

A second embodiment of the present invention is a gaming machine utilizing only standard reels, and no bonus reels. In this second embodiment, both the standard symbols and the bonus symbols are located on the standard reels. The bonus symbols include at least one upgrade symbol and may include other bonus symbols corresponding to other various bonus awards. Similar to the first embodiment, the second embodiment entitles a player to a symbol upgrade bonus each time an upgrade symbol lands on a payline. In this embodiment, a winning combination is completed when the combination of bonus symbols and standard symbols on the payline comprises a winning combination according to the pay table. The bonus symbols may act as "wild" symbols thereby completing a winning combination on the payline. Alternatively, the bonus symbols, including the upgrade symbol, may act as an independent symbol which is part of certain winning combinations on the pay table.

In the second embodiment, upgrade symbols which land on the payline at the conclusion of a play of the game entitle the player to a symbol upgrade on a winning combination on a future play of the game. Preferably, the symbol upgrade is executed automatically by the gaming machine and is applied to the subsequent play of the game. However, the symbol upgrade may also be stored in a bank of the gaming machine where one or more symbol upgrades may be applied to future plays of the game. For example, a player may store symbol upgrades in the bank and select future plays of the game to which the symbol upgrade would be applied. In an alternative embodiment, the player may apply more than one symbol upgrade to a particular play of the game in an attempt to upgrade the winning combination by more than one level on the pay table. In yet another alternative embodiment, banked symbol upgrades would be automatically applied by the gaming machine to subsequent winning combinations. Multiple and varied alternatives to the second embodiment of the invention exist in which earned symbol upgrades may be banked, stored, applied, or forfeited.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a wagering game on a gaming machine, comprising:

receiving, by the gaming machine, a wager from a player, the gaming machine having a display, the display displaying symbols in an array having a fixed number of symbol positions;

displaying, by the display, a first winning combination of symbols in the fixed number of symbol positions of the array, the first winning combination being associated with a first predetermined award;

in response to a predetermined event, automatically upgrading the first winning combination by modifying each of the symbols of the first winning combination to a second winning combination of symbols without interaction by the player, the second winning combination being associated with a second predetermined award that is higher than the first predetermined award, the second winning combination being determined in the fixed number of symbol positions in the array and having a same number of symbols as the first winning combination;

displaying, by the display, the second winning combination of symbols in the fixed number of symbol positions in the array; and providing, by the gaming machine, the player with the second predetermined award.

2. The method of claim 1, wherein the array includes a first set of reels, and the first winning combination is indicated by the first set of reels.

3. The method of claim 2, wherein the predetermined event is indicated by at least one additional reel.

4. The method of claim 1, wherein the wagering game is selected from a group consisting of a poker game, a blackjack game, a keno game, and a slots game.

5. The method of claim 1, further comprising a pay table, the pay table including a listing of a plurality of winning combinations, the plurality of winning combinations including the first winning combination and the second winning combination.

6. The method of claim 5, wherein the pay table includes a corresponding predetermined award for each of the plurality of winning combinations.

7. The method of claim 1, wherein the predetermined event is an upgrade symbol within the first winning combination.

8. A computer readable storage medium or media encoded with instructions for directing a gaming device to perform the method of claim 1.

9. A gaming machine comprising:

an input device for receiving inputs from a player during the wagering game, the inputs including a wager amount; and a display for displaying an upgrade-triggering outcome and for displaying a plurality of symbols in a fixed number of symbol positions in an array that indicate a randomly selected outcome of the wagering game, the randomly selected outcome being selected from a plurality of outcomes, the plurality of outcomes including at least a first winning outcome and a second winning outcome, the first winning outcome being associated with a first predetermined award, the second winning outcome being associated with a second predetermined award that is higher than the first predetermined award, the second winning outcome being determined in the fixed number of symbol positions in the array and having a same number of symbols as the first winning outcome;

wherein, in response to the first winning outcome and the upgrade-triggering outcome being displayed, each of the symbols of the first winning outcome is modified to the second winning outcome without interaction by the player and the predetermined award associated with the first winning outcome is automatically upgraded to the predetermined award associated with the second winning outcome.

10. The gaming machine of claim 9, wherein the upgrade-triggering outcome is one of the plurality of symbols in the first winning outcome.

11. The gaming machine of claim 9, wherein the display includes a first set of mechanical reels for displaying the randomly selected outcome, the display further including an additional reel for displaying the upgrade-triggering outcome.

12. The gaming machine of claim 9, wherein the second winning outcome is randomly selected.

13. The gaming machine of claim 9 wherein the display includes a first set of reels and a second set of reels, wherein the upgrade-triggering outcome is displayed on the second set of reels.

14. A method of conducting a wagering game comprising:

receiving, by a gaming machine, a wager from a player, the gaming machine having a display;

displaying, by the display, a plurality of symbols on a first set of reels, the first set of reels having a fixed number of symbol positions, the plurality of symbols indicating a first winning outcome, the first winning outcome being selected from a plurality of outcomes, the plurality of outcomes including at least the first winning outcome and a second winning outcome, the first winning outcome being associated with a first predetermined award, the second winning outcome being associated with a second predetermined award that is higher than the first predetermined award, the second winning outcome being determined in the fixed number of symbol positions in the first set of reels and having a same number of symbols as the first winning outcome;

in response to the first winning outcome including a bonus-triggering event, displaying, by the display, at least a second reel to display a bonus symbol;

in response to the bonus symbol being an upgrade symbol, automatically upgrading the first winning outcome by modifying each of the symbols of the first winning outcome to the second winning outcome without interaction by the player;

displaying, by the display, the second winning outcome; and providing, by the gaming machine, the player with the second predetermined award.

15. The method of claim 14, wherein the second reel includes a plurality of bonus symbols selected from a group consisting of the upgrade symbol, at least one multiplier symbol, at least one free spin symbol, and at least one credit symbol.

16. The method of claim 14, wherein the bonus triggering event is a symbol in the symbol combination that corresponds to the first winning outcome.

17. The method of claim 14, wherein, in response to the bonus-symbol being the upgrade symbol the player determines when the second predetermined award is provided.

* * * * *